United States Patent

Flinck et al.

(10) Patent No.: US 11,792,626 B2
(45) Date of Patent: Oct. 17, 2023

(54) COMBINED SERVICE DISCOVERY AND CONNECTION SETUP FOR SERVICE-BASED ARCHITECTURES

(71) Applicant: Nokia Solutions and Networks Oy, Espoo (FI)

(72) Inventors: Hannu Flinck, Helsinki (FI); Hans-Jochen Morper, Erdweg (DE)

(73) Assignee: Nokia Solutions and Networks Oy, Espoo (FI)

( * ) Notice: Subject to any disclaimer, the term of this patent is extended or adjusted under 35 U.S.C. 154(b) by 241 days.

(21) Appl. No.: 17/433,590

(22) PCT Filed: Feb. 25, 2019

(86) PCT No.: PCT/FI2019/050150
§ 371 (c)(1),
(2) Date: Aug. 24, 2021

(87) PCT Pub. No.: WO2020/174119
PCT Pub. Date: Sep. 3, 2020

(65) Prior Publication Data
US 2022/0159433 A1 May 19, 2022

(51) Int. Cl.
*H04W 4/50* (2018.01)
*H04W 12/084* (2021.01)
(Continued)

(52) U.S. Cl.
CPC .............. *H04W 4/50* (2018.02); *H04L 63/166* (2013.01); *H04W 12/03* (2021.01); *H04W 12/06* (2013.01); *H04W 12/084* (2021.01)

(58) Field of Classification Search
CPC ....... H04W 4/50; H04W 12/03; H04W 12/06; H04W 12/084; H04W 48/16; H04L 63/166; H04L 63/068
See application file for complete search history.

(56) References Cited

U.S. PATENT DOCUMENTS

2020/0028920 A1\* 1/2020 Livanos ................. H04W 8/26
2020/0137174 A1\* 4/2020 Stammers ............ H04L 67/141

FOREIGN PATENT DOCUMENTS

WO 2013/101765 A1 7/2013
WO 2018/171316 A1 9/2018

OTHER PUBLICATIONS

"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.

(Continued)

*Primary Examiner* — Brandon J Miller
(74) *Attorney, Agent, or Firm* — Nokia Solutions and Networks Oy

(57) ABSTRACT

Methods, apparatuses, and computer program products are provided in accordance with example embodiments for providing a combined service discovery and connection setup for a fifth-generation (5G) service-based architecture (SBA), and particularly for streamlined provisioning of services associated with a network repository function (NRF) from network function (NF) service providers to NF service consumers. In some embodiments, the NRF can register NF service providers by, at least, identifying supported transport layer network protocols (TLNPs) and then identifying for the NF service consumer only services associated with NF service providers supporting the same TNLP so that a further suitability handshake between the NF service consumer and the NF service provider is not required. In some embodiments, initial authentication of the NF service consumer by the NRF under a cryptographic protocol can be used as preauthorization for direct communication and service provisioning between the NF service (Continued)

provider and the NF service consumer, without requiring secondary authentication.

21 Claims, 10 Drawing Sheets

(51) Int. Cl.
  *H04W 12/03* (2021.01)
  *H04L 9/40* (2022.01)
  *H04W 12/06* (2021.01)

(56) References Cited

OTHER PUBLICATIONS

"3rd Generation Partnership Project; Technical Specification Group Services and System Aspects; Procedures for the 5G System; Stage 2 (Release 15)", 3GPP TS 23.502, V15.3.0, Sep. 2018, pp. 1-330.
"3rd Generation Partnership Project; Technical Specification Group Core Network and Terminals; 5G System; Technical Realization of Service Based Architecture; Stage 3 (Release 15)", 3GPP TS 29.500, V2.0.0, Jun. 2018, pp. 1-28.
"3rd Generation Partnership Project; Technical Specification Group Services and System Aspects; Study on Enhancements to the Service-Based Architecture (Release 16)", 3GPP TR 23.742, V0.3.0, Jul. 2018, pp. 1-64.
"3rd Generation Partnership Project; Technical Specification Group Core Network and Terminals; 5G System Network Function Repository Services; Stage 3 (Release 15)", 3GPP TS 29.510, V15.0.0, Jun. 2018, pp. 1-64.
"3rd Generation Partnership Project; Technical Specification Group Services and System Aspects; Security architecture and procedures for 5G system (Release 15)", 3GPP TS 33.501, V15.2.0, Sep. 2018, pp. 1-175.
Belshe et al., "Hypertext Transfer Protocol Version 2 (HTTP/2)", RFC 7540, Internet Engineering Task Force, May 2015, pp. 1-96.
Hardt, "The OAuth 2.0 Authorization Framework", RFC 6749, Internet Engineering Task Force, Oct. 2012, pp. 1-76.
Bishop, "Hypertext Transfer Protocol (HTTP) over QUIC draft-ietf-Quic-http-16", Internet-Draft, Oct. 24, 2018, pp. 1-48.
"3rd Generation Partnership Project; Technical Specification Group Core Network and Terminals; Study on IETF QUIC Transport for 5GC Service Based Interfaces; (Release 16)", 3GPP TR 29.893, V0.4.0, Dec. 2018, pp. 1-30.
Nottingham et al., "HTTP Alternative Services", RFC 7838, Internet Engineering Task Force, Apr. 2016, pp. 1-20.
Iyengar et al., "QUIC: A UDP-Based Multiplexed and Secure Transport", QUIC, IETF Internet-Draft, Oct. 23, 2018, pp. 1-135.
Kuehlewind et al., "Applicability of the QUIC Transport Protocol", Network Working Group, IETF Internet-Draft, Oct. 22, 2018, pp. 1-13.
Bishop, "Hypertext Transfer Protocol Version 3 (HTTP/3)", QUIC, IETF Internet-Draft, Dec. 18, 2018, pp. 1-51.
"5G Architecture", Cloudify Network, Retrieved on Aug. 27, 2021, Webpage available at: https://cloudifynetwork.com/5g-architecture/.
Thomson et al., "Using Transport Layer Security (TLS) to Secure QUIC Draft-IETF-QUIC- TLS-13", Internet-Draft, Jun. 28, 2018, pp. 1-29.
"3rd Generation Partnership Project; Technical Specification Group Services and System Aspects; Security Aspects; Study on security aspects of the 5G Service Based Architecture (SBA) (Release 16)", 3GPP TR 33.855, V1.3.0, Nov. 2018, pp. 1-51.
Wang, "Service Based Interface Development in 5G CN", 5th OAI Workshop, Jun. 23, 2018, pp. 1-23.
"Go Microservices, Part 7: Service Discovery and Load Balancing", DZone, Retrieved on Aug. 27, 2021, Webpage available at : https://dzone.com/articles/go-microservices-part-7-service-discovery-amp-load.
Mayer, "Restful APIS for the 5G Service Based Architecture", Journal of ICT, vol. 6, No. 1 & 2, May 2018, pp. 101-116.
International Search Report and Written Opinion received for corresponding Patent Cooperation Treaty Application No. PCT/FI2019/050150, dated Jun. 20, 2019, 14 pages.
"Pseudo-CR on NF Service Discovery and Selection Requirements", 3GPP TSG CT4 Meeting #79, C4-174018, Agenda: 6.2.1, Nokia, Aug. 21-25, 2017, 4 pages.
"3rd Generation Partnership Project; Technical Specification Group Services and System Aspects; Procedures for the 5G System; Stage 2 (Release 15)", 3GPP TS 23.502, V15.4.1, Jan. 2019, pp. 1-347.
"Multiple SCTP associations over NG-C", 3GPP TSG-RAN WG3 Meeting#97, R3-173042, Agenda: 10.5.1, Huawei, Aug. 21-25, 2017, 3 pages.
"On multiple SCTP associations for NG-C", 3GPP TSG RAN WG3 Meeting #97bis, R3-173794, Agenda: 10.5.1, Intel Corporation, Oct. 9-13, 2017, pp. 1-6.

\* cited by examiner

COMBINED SERVICE DISCOVERY AND CONNECTION SETUP FOR SERVICE-BASED ARCHITECTURES

RELATED APPLICATION

This application was originally filed as PCT Application No. PCT/FI2019/050150, filed on Feb. 25, 2019, of which is incorporated herein by reference in its entirety.

BACKGROUND

As mobile communication technology advances, the requirements and standards adopted by the mobile communications industry are continually updated and changed. Telecommunications standards such as the fifth generation (5G) standard often require a service based architecture in which network functions within a control plane are characterized by modularized services that may be re-used by multiple network functions. Additionally, service based interfaces are used for the interactions between the core network control plane functions and for accessing services provided by Network Functions (NFs). This modularized approach towards defining a control plane architecture is considered suitable for a virtualized network and offers greater reusability, scalability and interface simplification than a traditional point to point reference model. As there is a continued effort to reduce latency, increase transfer speeds, and increase efficiency of authentication and connection between providers and consumers under many telecommunications standards, such as the 5G standard, there is a continued desire in the industry to reduce inefficiencies in how services are requested, identified based on the request, and provisioned to the service consumer.

BRIEF SUMMARY

Methods, apparatuses, and computer program products are provided in accordance with example embodiments in order to provide a combined service discovery and connection setup for a wide array of service-based architectures (SBA) for any suitable telecommunications standard or protocol. While the systems, methods, apparatuses, and computer program products described herein are sometimes discussed in the context of a fifth-generation (5G) standard, this disclosure contemplates and includes within its scope many other standards or protocols, such as the 1G, 2G, Global System for Mobile communications (GSM), 3G, 3.5G, 3.75G, Universal Mobile Telecommunications System (UMTS), Enhanced Data Rates for GSM Evolution (EDGE), CDMA2000, High-Speed Downlink Packet Access, 3GPP Long Term Evolution (LTE), 4G, 4.5 G, other suitable standards or protocols, variants thereof, and combinations thereof.

In particular, disclosed herein, in accordance with some example embodiments, is methods for streamlined provisioning of services associated with a network repository function (NRF) from network function (NF) service providers to NF service consumers. In some embodiments, the NRF can register NF service providers by, at least, identifying supported transport layer network protocols (TLNPs) and then identifying for the NF service consumer only services associated with NF service providers supporting the same TNLP so that a further suitability handshake between the NF service consumer and the NF service provider is not required. In some embodiments, initial authentication of the NF service consumer by the NRF under a cryptographic protocol can be used as preauthorization for direct communication and service provisioning between the NF service provider and the NF service consumer, without requiring secondary authentication.

In one example embodiment, a method for provisioning one or more desired services associated with a network repository function to a network function service consumer is provided. In some embodiments, the method includes, at least receiving, from the network function service consumer, a request to access the one or more desired services associated with the network repository function, the request comprising an indication of at least a transport layer network protocol supported by the network function service consumer, determining whether the transport layer network protocol supported by the network function service consumer is a same transport layer network protocol supported by both the network function service consumer and one or more network function service providers associated with the one or more desired services, and in an instance in which it is determined that the transport layer network protocol supported by the network function service consumer is the same transport layer network protocol supported by both the network function service consumer and the one or more network function service providers associated with the one or more desired services, providing to the network function service consumer, without requiring a connection establishment handshake between the network function service consumer and the one or more network function service providers associated with the one or more desired services, a list of matching services and authenticated values corresponding to the same transport layer network protocol. In some embodiments, the same transport layer network protocol is a Quick User Datagram Protocol Internet Connection (QUIC) transport layer network protocol. In some embodiments, a plurality of network function service providers comprises at least the one or more corresponding network function service providers. In some embodiments, the method can include receiving, from at least a portion of the plurality of network function service providers, information indicative of network function service provider's connection capabilities and/or connection parameters, such as a list of supported transport layer network protocols. In some embodiments, in an instance in which the list of supported transport layer network protocols are received from at least the one or more corresponding network function service providers, the method can further include registering the one or more corresponding network function service providers as authenticated network function service providers associated with a network repository function. In some embodiments, the method can further include providing query parameters to the network function service consumer, the query parameters comprising at least a request for a list of transport layer network protocols by the network function service consumer. In some embodiments, the list of matching services and authenticated values are protected by a cryptographic authentication established between the network function service consumer and the network repository function.

In one example embodiment, a method for a network function service consumer to access one or more desired services associated with a network repository function is provided. In some embodiments, the method can include providing, to the network repository function, a request to access the one or more desired services, the request comprising an indication of a transport layer network protocol supported by the network function service consumer, in an instance in which the supported transport layer network protocol is a same transport layer network protocol supported by one or more corresponding network function service providers, receiving a list of matching services and authenticated values corresponding to the same transport layer network protocol, and after receiving the list of matching services and authenticated values, connecting to the one or more corresponding network function service providers, without being required to conduct a connection establishment handshake with the one or more network function service providers, to access the one or more desired services. In some embodiments, the same transport layer network protocol is a Quick User Datagram Protocol Internet Connection (QUIC) transport layer network protocol. In some embodiments, the method can further include receiving, from the network repository function, query parameters comprising at least a request for a list of transport layer network protocols by the network function service consumer. In some embodiments, the list of matching services and authenticated values are protected by a cryptographic authentication established between the network function service consumer and the network repository function.

In one example embodiment, an apparatus configured to provision one or more desired services associated with a network repository function to a network function service consumer is provided. In some embodiments, the apparatus can include, at least, one processor and at least one memory including computer program code with at least one memory and the computer program code configured to, with the processor, cause the apparatus to at least: receive, from a network function service consumer, a request to access one or more desired services associated with a network repository function, the request comprising an indication of at least a transport layer network protocol supported by the network function service consumer, determine whether the transport layer network protocol supported by the network function service consumer is a same transport layer network protocol supported by both the network function service consumer and one or more network function service providers associated with the one or more desired services, and in an instance in which it is determined that the transport layer network protocol supported by the network function service consumer is the same transport layer network protocol supported by both the network function service consumer and the one or more network function service providers associated with the one or more desired services, cause provision to the network function service consumer, without requiring a connection establishment handshake between the network function service consumer and the one or more network function service providers associated with the one or more desired services, of a list of matching services and authenticated values corresponding to the same transport layer network protocol. In some embodiments, the same transport layer network protocol is a Quick User Datagram Protocol Internet Connection (QUIC) transport layer network protocol. In some embodiments, a plurality of network function service providers comprises at least the one or more corresponding network function service providers, wherein the at least one memory and the computer program code are configured to, with the processor, receive, from at least a portion of the plurality of network function service providers, information indicative of network function service provider's connection capabilities and/or connection parameters, such as a list of supported transport layer network protocols. In some embodiments, the at least one memory and the computer program code are further configured, with the processor, in an instance in which the list of supported transport layer network protocols are received from at least the one or more corresponding network function service providers, to register the one or more corresponding network function service providers as authenticated network function service providers associated with a network repository function. In some embodiments, the at least one memory and the computer program code are further configured to, with the processor, provide query parameters to the network function service consumer, the query parameters comprising at least a request for a list of transport layer network protocols by the network function service consumer. In some embodiments, the list of matching services and authenticated values are protected by a cryptographic authentication established between the network function service consumer and the network repository function.

In one example embodiment, an apparatus configured to request access from a network repository function to one or more desired services is provided. In some embodiments, the apparatus can include, at least, one processor and at least one memory including computer program code with at least one memory and the computer program code configured to, with the processor, cause the apparatus to at least: provide, to the network repository function, a request to access the one or more desired services, the request comprising an indication of a transport layer network protocol supported by the network function service consumer, in an instance in which the supported transport layer network protocol is a same transport layer network protocol supported by one or more corresponding network function service providers, receive a list of matching services and authenticated values corresponding to the same transport layer network protocol, and after receiving the list of matching services and authenticated values, connect to the one or more corresponding network function service providers, without being required to conduct a connection establishment handshake with the one or more network function service providers, to access the one or more desired services. In some embodiments, the same transport layer network protocol is a Quick User Datagram Protocol Internet Connection (QUIC) transport layer network protocol. In some embodiments, the at least one memory and the computer program code are configured to, with the processor, receive query parameters from the network repository function, the query parameters comprising at least a request for a list of transport layer network protocols by the network function service consumer. In some embodiments, the list of matching services and authenticated values are protected by a cryptographic authentication established between the network function service consumer and the network repository function.

In a further example embodiment, a computer program product is provided that is suitable for provisioning one or more desired services associated with a network repository function to a network function service consumer, the computer program products includes at least one non-transitory computer readable storage medium having computer-executable program code portions stored therein with the computer-executable program code portions including program code instructions configured to receive, from a network function service consumer, a request to access one or more desired services associated with a network repository function, the request comprising an indication of at least a transport layer network protocol supported by the network function service consumer, determine whether the transport layer network protocol supported by the network function service consumer is a same transport layer network protocol supported by both the network function service consumer and one or more network function service providers associated with the one or more desired services, and in an instance in which it is determined that the transport layer network protocol supported by the network function service consumer is the same transport layer network protocol supported by both the network function service consumer and the one or more network function service providers associated with the one or more desired services, cause provision to the network function service consumer, without requiring a connection establishment handshake between the network function service consumer and the one or more network function service providers associated with the one or more desired services, of a list of matching services and authenticated values corresponding to the same transport layer network protocol. In some embodiments, the same transport layer network protocol is a Quick User Datagram Protocol Internet Connection (QUIC) transport layer network protocol. In some embodiments, a plurality of network function service providers comprises at least the one or more corresponding network function service providers. In some embodiments, the computer code portions are further configured to receive, from at least a portion of the plurality of network function service providers, information indicative of network function service provider's connection capabilities and/or connection parameters, such as a list of supported transport layer network protocols. In some embodiments, the computer code portions are configured, in an instance in which the list of supported transport layer network protocols is received from at least the one or more corresponding network function service providers, to register the one or more corresponding network function service providers as authenticated network function service providers associated with a network repository function. In some embodiments, the computer code portions are configured to provide query parameters to the network function service consumer, the query parameters comprising at least a request for a list of transport layer network protocols by the network function service consumer. In some embodiments, the list of matching services and authenticated values are protected by a cryptographic authentication established between the network function service consumer and the network repository function.

In a further example embodiment, a computer program product is provided that is suitable for provisioning one or more desired services associated with a network repository function to a network function service consumer, the computer program products includes at least one non-transitory computer readable storage medium having computer-executable program code portions stored therein with the computer-executable program code portions including program code instructions configured to provide, to the network repository function, a request to access the one or more desired services, the request comprising an indication of a transport layer network protocol supported by the network function service consumer, in an instance in which the supported transport layer network protocol is a same transport layer network protocol supported by one or more corresponding network function service providers, receive a list of matching services and authenticated values corresponding to the same transport layer network protocol, and after receiving the list of matching services and authenticated values, connect to the one or more corresponding network function service providers, without being required to conduct a connection establishment handshake with the one or more network function service providers, to access the one or more desired services. In some embodiments, the same transport layer network protocol is a Quick User Datagram Protocol Internet Connection (QUIC) transport layer network protocol. In some embodiments, the program code portions are further configured to receive query parameters from the network repository function, the query parameters comprising at least a request for a list of transport layer network protocols by the network function service consumer. In some embodiments, the list of matching services and authenticated values are protected by a cryptographic authentication established between the network function service consumer and the network repository function.

In yet another example embodiment, an apparatus is provided that includes means for provisioning one or more desired services associated with a network repository function to a network function service consumer. In some embodiments, the apparatus includes means for receiving, from the network function service consumer, a request to access the one or more desired services associated with the network repository function, the request comprising an indication of at least a transport layer network protocol supported by the network function service consumer. In some embodiments, the apparatus includes means for determining whether the transport layer network protocol supported by the network function service consumer is a same transport layer network protocol supported by both the network function service consumer and one or more network function service providers associated with the one or more desired services. In some embodiments, the apparatus further includes means for, in an instance in which it is determined that the transport layer network protocol supported by the network function service consumer is the same transport layer network protocol supported by both the network function service consumer and the one or more network function service providers associated with the one or more desired services, providing to the network function service consumer, without requiring a connection establishment handshake between the network function service consumer and the one or more network function service providers associated with the one or more desired services, a list of matching services and authenticated values corresponding to the same transport layer network protocol. In some embodiments, a plurality of network function service providers comprises at least the one or more corresponding network function service providers. In some embodiments, the apparatus can further include means for receiving, from at least a portion of the plurality of network function service providers, information indicative of network function service provider's connection capabilities and/or connection parameters, such as a list of supported transport layer network protocols. In some embodiments, the apparatus can include means for, in an instance in which the list of supported transport layer network protocols is received from at least the one or more corresponding network function service providers registering the one or more corresponding network function service providers as authenticated network function service providers associated with a network repository function. In some embodiments, the apparatus can include means for providing query parameters to the network function service consumer, the query parameters comprising at least a request for a list of transport layer network protocols by the network function service consumer.

In yet another example embodiment, an apparatus is provided that includes means for a network function service consumer to access one or more desired services associated with a network repository function. In some embodiments, the apparatus includes means for providing, to the network repository function, a request to access the one or more desired services, the request comprising an indication of a transport layer network protocol supported by the network function service consumer. In some embodiments, the apparatus includes means for, in an instance in which the supported transport layer network protocol is a same transport layer network protocol supported by one or more corresponding network function service providers, receiving a list of matching services and authenticated values corresponding to the same transport layer network protocol. In some embodiments, the apparatus can include means for, after receiving the list of matching services and authenticated values, connecting to the one or more corresponding network function service providers, without being required to conduct a connection establishment handshake with the one or more network function service providers, to access the one or more desired services. In some embodiments, the apparatus can include means for receiving, from the network repository function, query parameters comprising at least a request for a list of transport layer network protocols by the network function service consumer.

In yet another example embodiment, a method for provisioning one or more desired services associated with a network repository function to a network function service consumer can include, at least, receiving, from one or more network function service providers, network service profile information comprising an indication of at least a transport layer network protocol supported by the network function service provider. In some embodiments, the method can further include receiving, from a network function service consumer, a request to access the one or more desired services associated with the network repository function, the request comprising an indication of at least a transport layer network protocol supported by the network function service consumer. In some embodiments, the method can further include determining whether the transport layer network protocol supported by the network function service consumer is a same transport layer network protocol supported by both the network function service consumer and one or more network function service providers associated with the one or more desired services. In some embodiments, in an instance in which it is determined that the transport layer network protocol supported by the network function service consumer is the same transport layer network protocol supported by both the network function service consumer and the one or more network function service providers associated with the one or more desired services, the method can further include providing to the network function service consumer, without requiring a connection establishment handshake between the network function service consumer and the one or more network function service providers associated with the one or more desired services, a list of matching services and authenticated values corresponding to the same transport layer network protocol. In some embodiments, the transport layer network protocol supported by both the network function service consumer and the one or more network function service providers is QUIC. In some embodiments, one or more of the indication of at least the transport layer network protocol supported by the network function service provider and the indication of at least the transport layer network protocol supported by the network function service consumer is received via an HTTP/2 protocol.

In yet another example embodiment, a method for provisioning one or more desired services associated with a network repository function to a network function service consumer can include, at least, establishing a first connection with one or more network function service providers via a first transport layer network protocol type and receiving from the one or more network function service providers, via the first connection, network service profile information comprising an indication of at least a second transport layer network protocol type supported by the network function service provider. In some embodiments, the method can further include establishing a second connection with the network function service consumer via a third transport layer network protocol type and receiving, from the network function service provider, a request to access the one or more desired services associated with the network repository function, the request comprising an indication of at least a fourth transport layer network protocol type supported by the network function service consumer. In some embodiments, the method can further include determining whether the second transport layer network protocol type and the fourth transport layer network protocol type are a same transport layer network protocol type. In some embodiments, in an instance in which it is determined that the transport layer network protocol supported by the network function service consumer is the same transport layer network protocol supported by both the network function service consumer and the one or more network function service providers associated with the one or more desired services, the method can further include providing to the network function service consumer, without requiring a connection establishment handshake between the network function service consumer and the one or more network function service providers associated with the one or more desired services, a list of matching services and authenticated values corresponding to the same transport layer network protocol. In some embodiments, the first transport layer network protocol type and/or the third transport layer network protocol type can be HTTP/2, and both the second transport layer network protocol type and the fourth transport layer network protocol type can be QUIC.

BRIEF DESCRIPTION OF THE DRAWINGS

Figure 1:
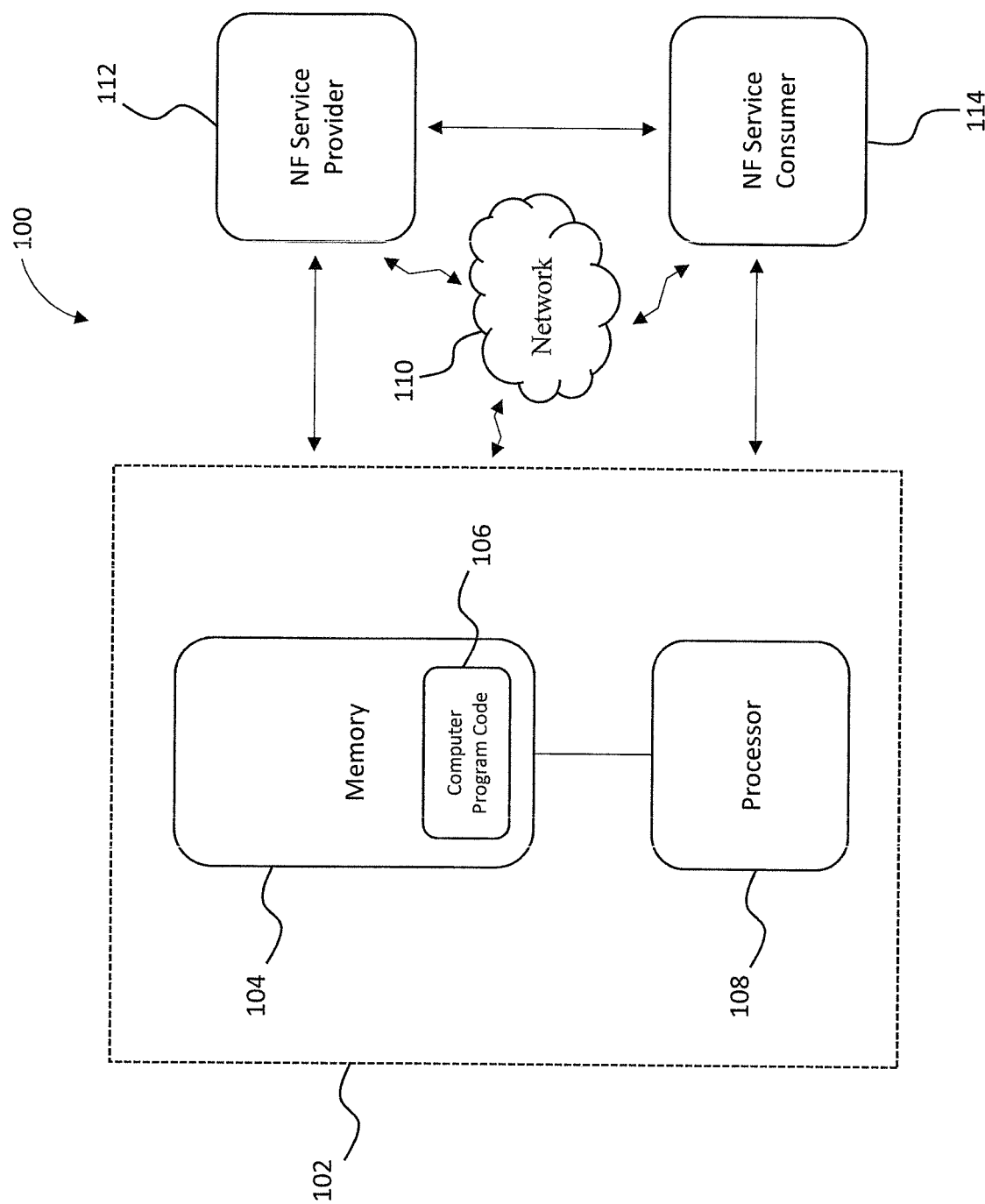
Figure 2:
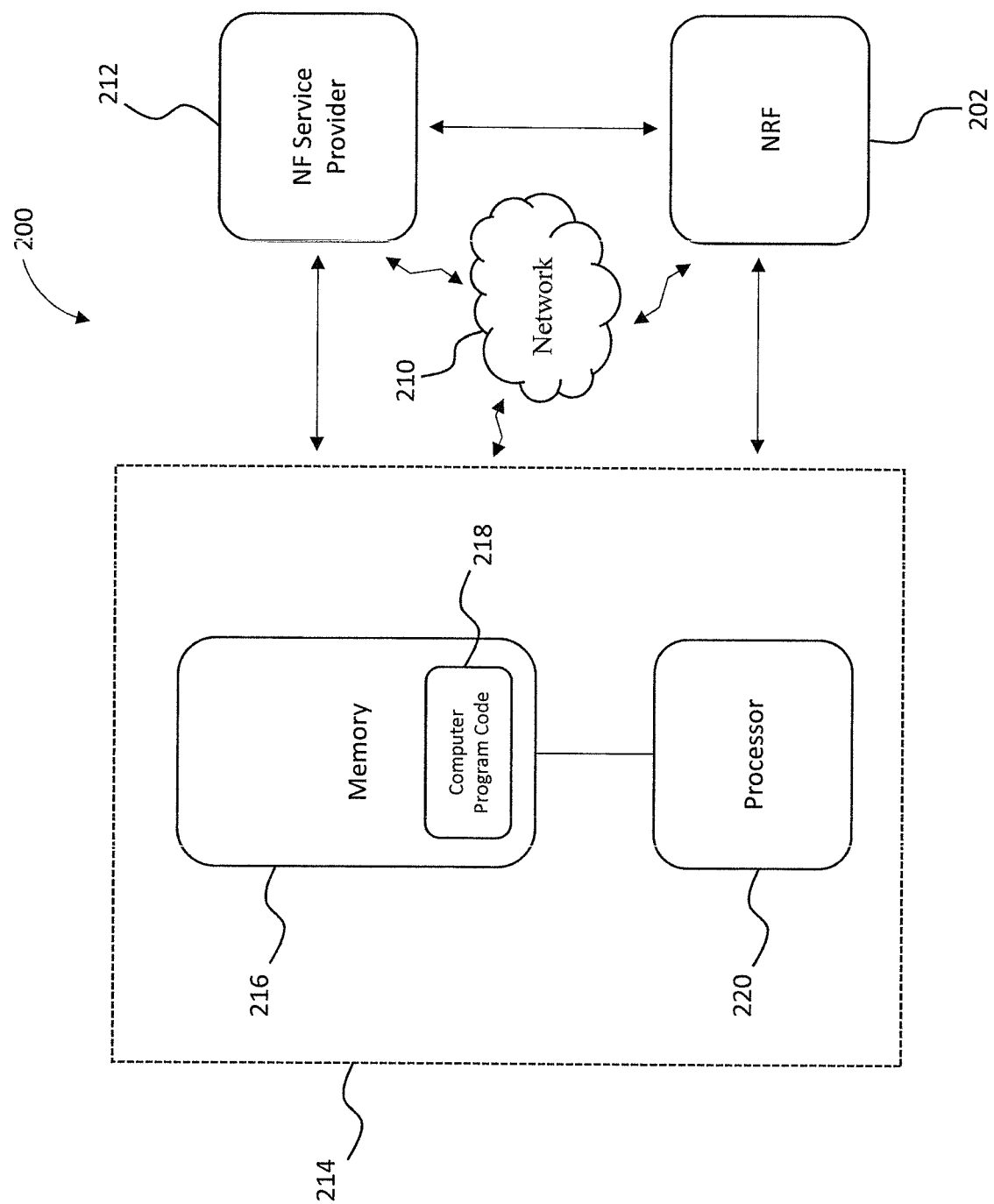
Figure 3:
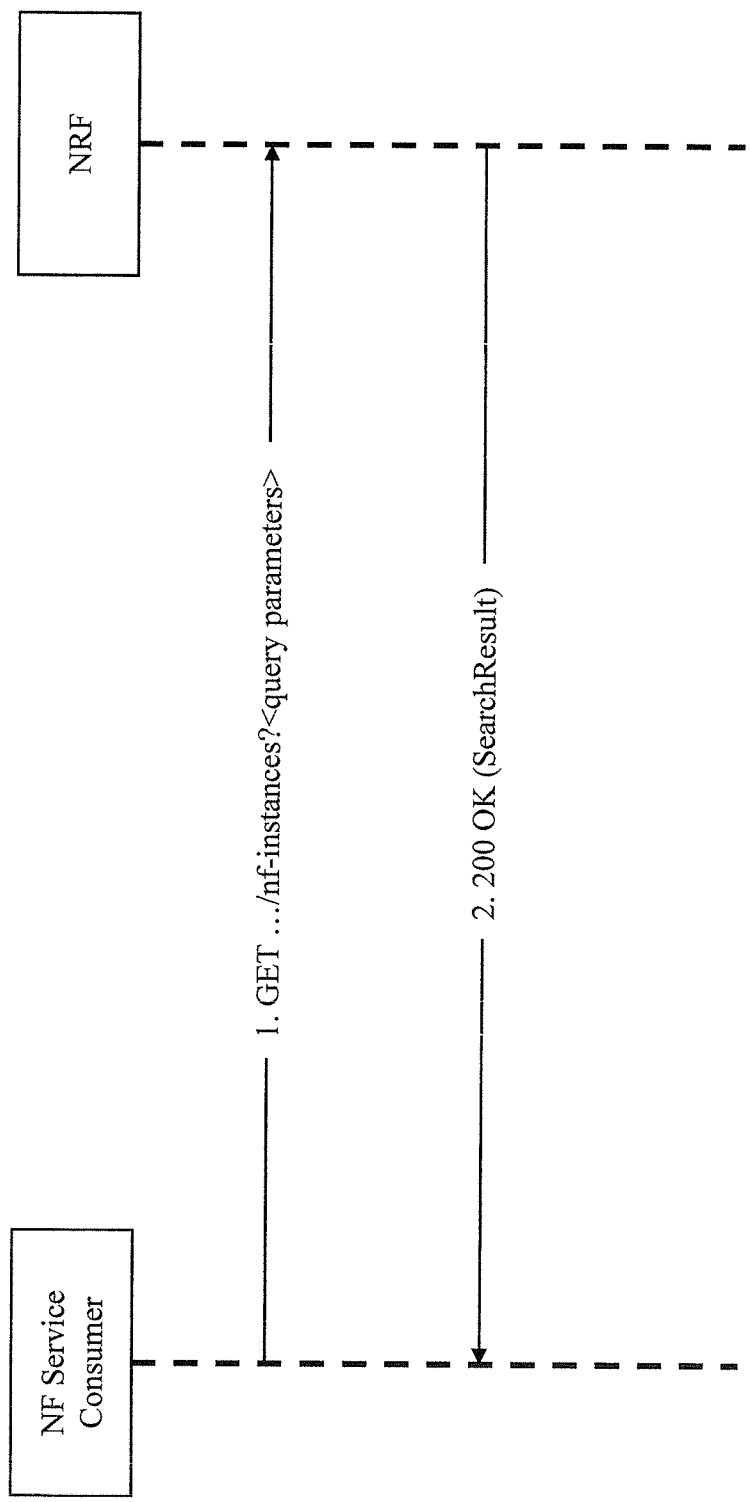
Figure 4:
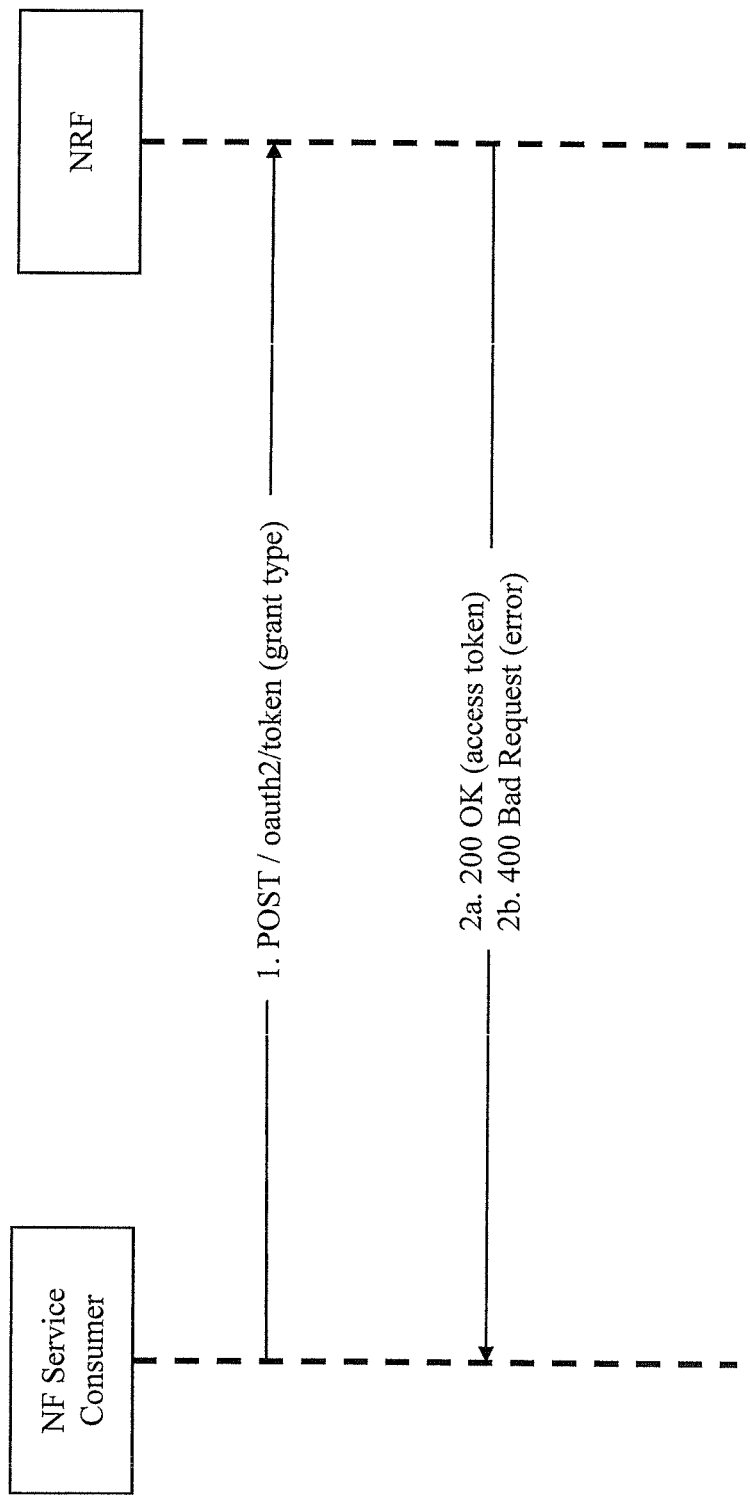
Figure 5:
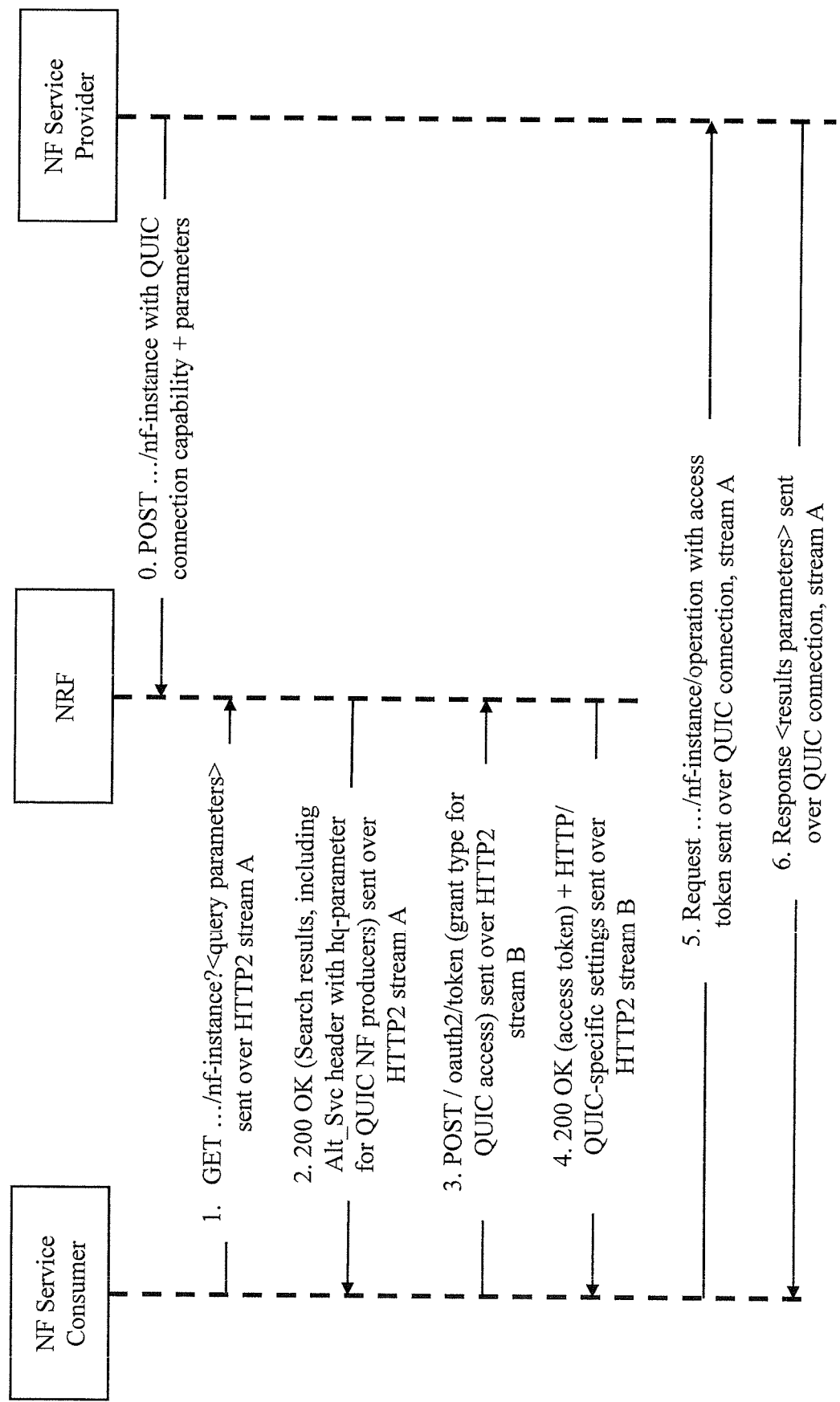
Figure 6:
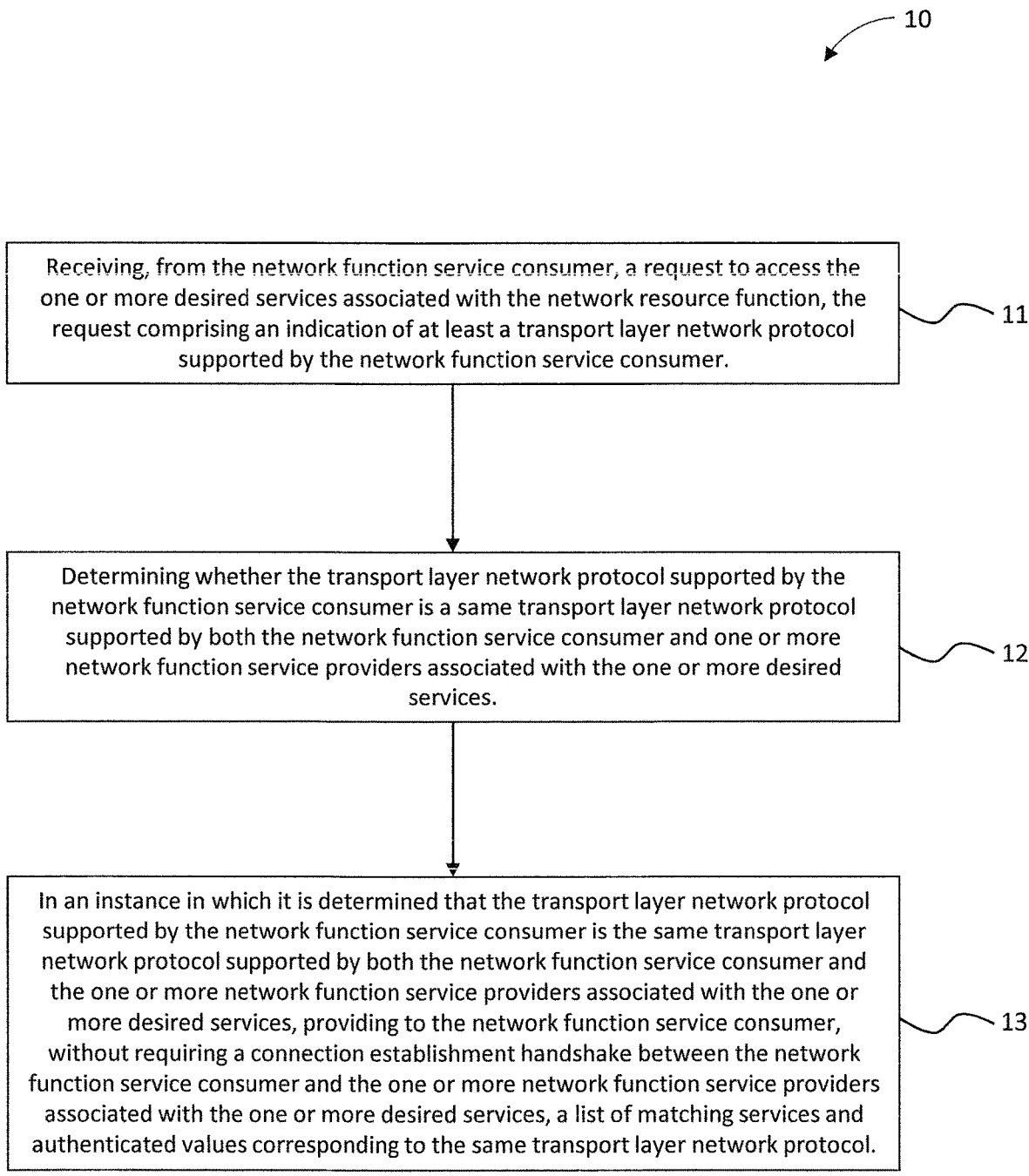
Figure 7:
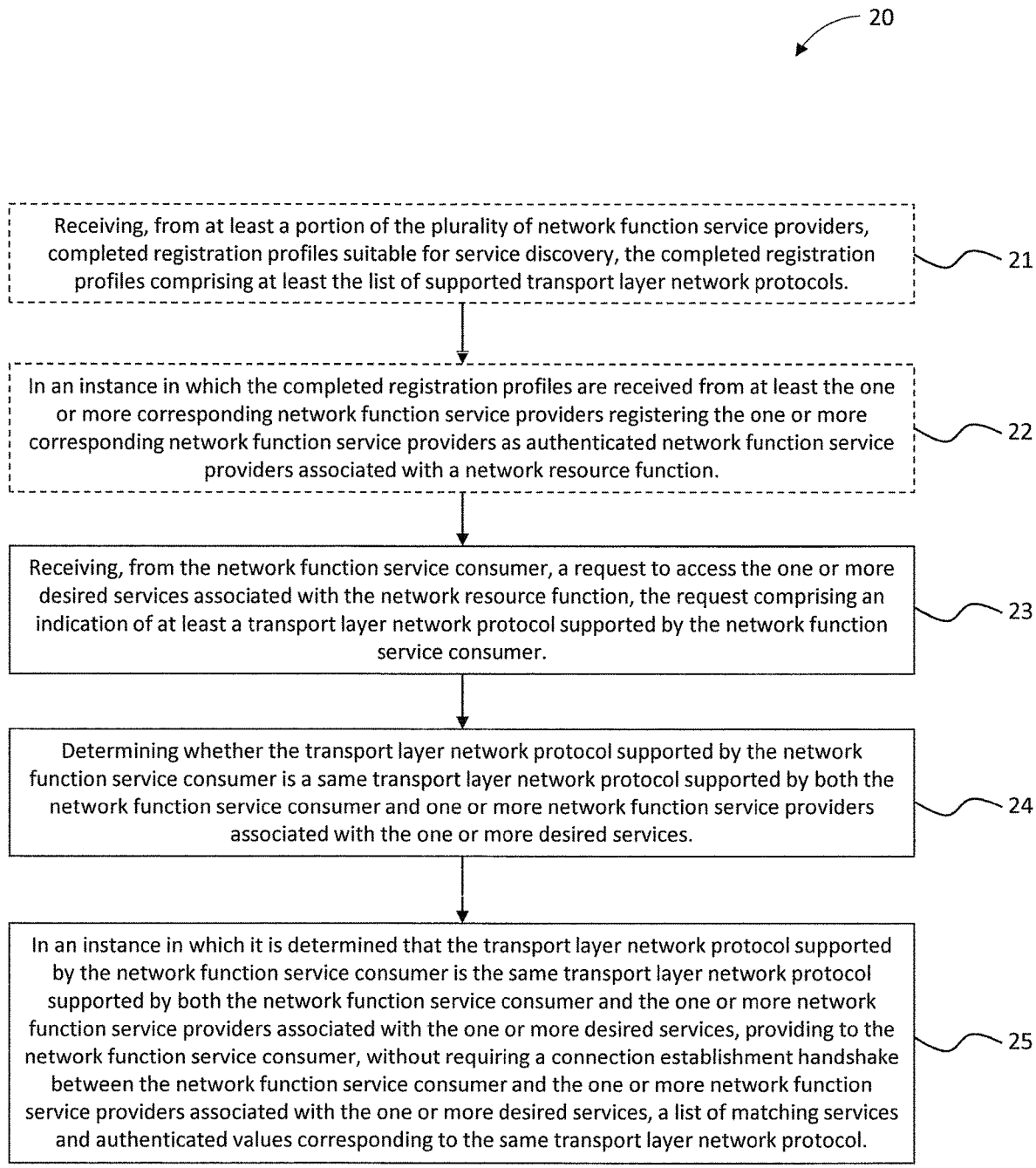
Figure 8:
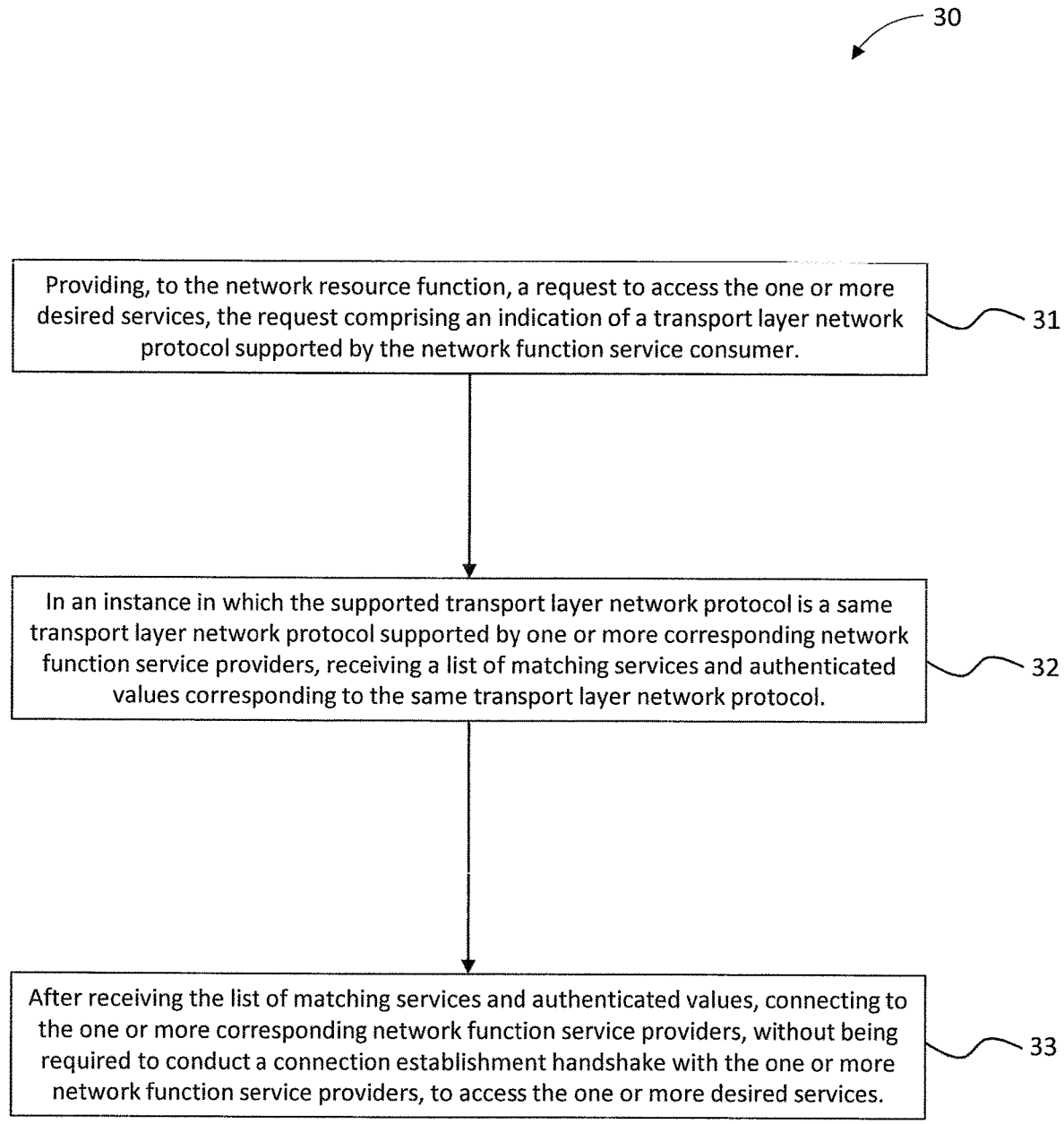

Having thus described certain example embodiments of the invention in general terms, reference will now be made to the accompanying drawings, which are not necessarily drawn to scale, and wherein:

FIG. 1 is a block diagram of a core network apparatus configured in accordance with an example embodiment of the present disclosure;

FIG. 2 is a block diagram of a user equipment apparatus configured in accordance with an example embodiment of the present disclosure;

FIG. 3 is a message chart illustrating a protocol for service discovery using a service discovery query, according to an embodiment;

FIG. 4 is a message chart illustrating a protocol for requesting an access token from a Network Repository Function (NRF), according to an embodiment;

FIG. 5 is a message chart illustrating a protocol for combined service discovery and QUIC stack setup, according to an embodiment;

FIG. 6 is a process flow chart of a method for provisioning one or more desired services associated with an NRF to a NF service consumer, according to an embodiment;

FIG. 7 is a process flow chart of a method for provisioning one or more desired services associated with an NRF to a NF service consumer, according to an embodiment; and FIG. 8 is a process flow chart of a method for a network function service consumer to access one or more desired services associated with a network repository function, according to an embodiment.

Figure 9:
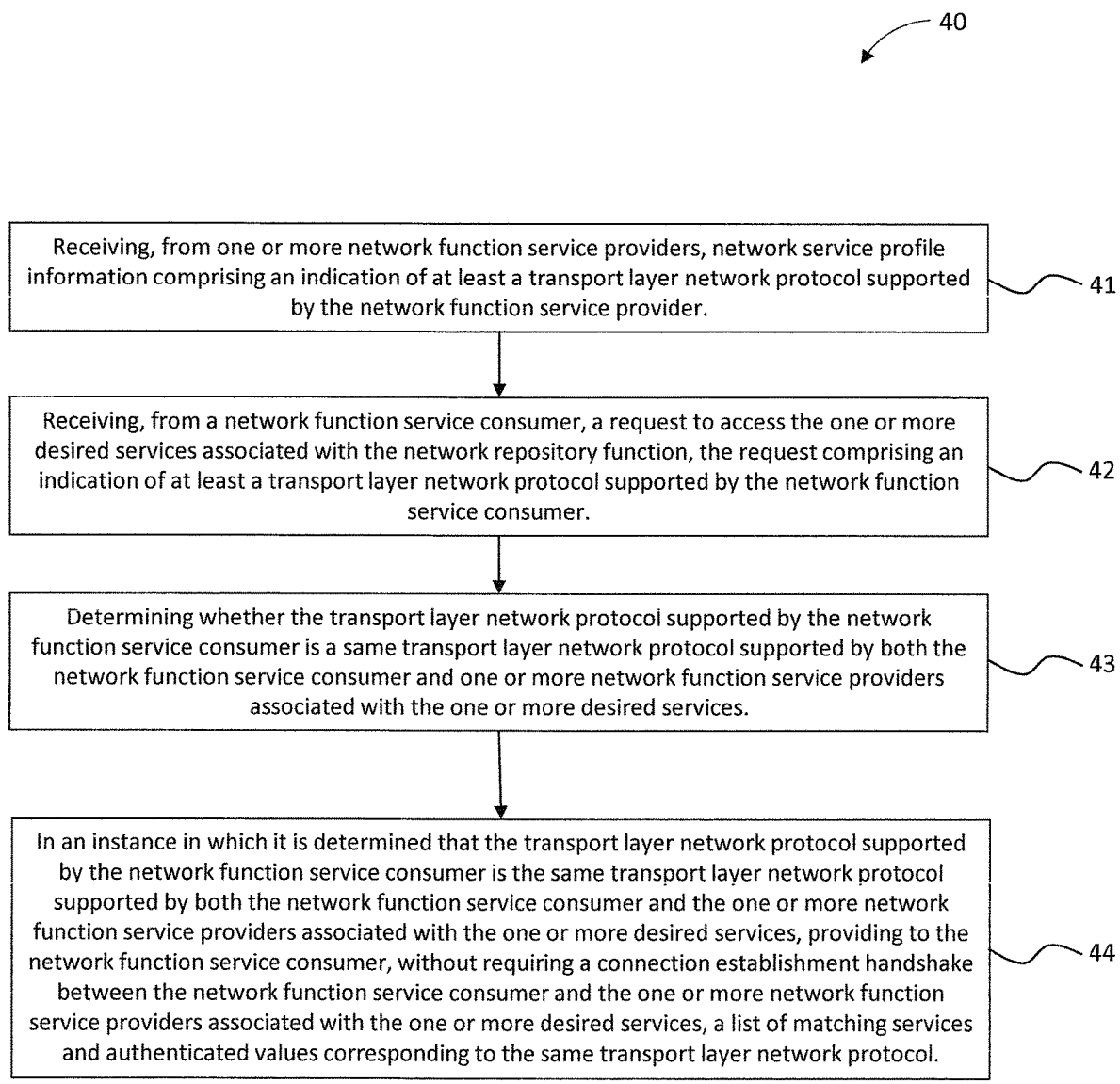

FIG. 9 is a process flow chart of a method for provisioning one or more desired services associated with an NRF to a NF service consumer, according to an embodiment.

Figure 10:
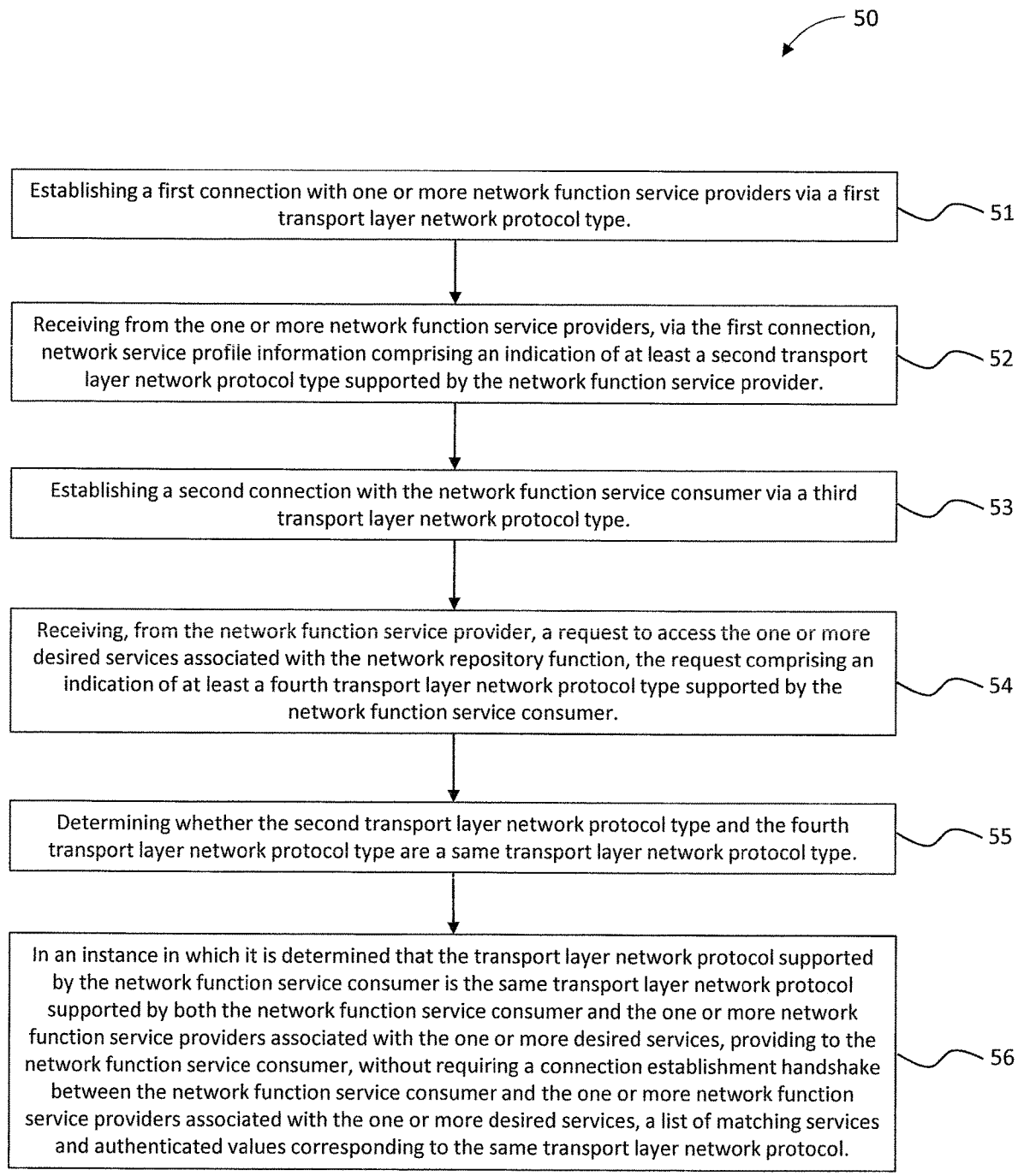

FIG. 10 is a process flow chart of a method for provisioning one or more desired services associated with an NRF to a NF service consumer, according to an embodiment.

DETAILED DESCRIPTION

As mobile communication technology advances, the requirements and standards adopted by the mobile communications industry are continually updated and changed. While the systems, methods, apparatuses, and computer program products described herein are sometimes discussed in the context of a fifth-generation (5G) standard, this disclosure contemplates and includes within its scope many other standards or protocols, such as the 1G, 2G, Global System for Mobile communications (GSM), 3G, 3.5G, 3.75G, Universal Mobile Telecommunications System (UMTS), Enhanced Data Rates for GSM Evolution (EDGE), CDMA2000, High-Speed Downlink Packet Access, 3GPP Long Term Evolution (LTE), 4G, 4.5 G, other suitable standards or protocols, variants thereof, and combinations thereof.

By way of example only, and in no way intending to limit the scope of this disclosure to one particular standard or protocol, examples provided herein often refer to the 5G standard, The group of 5G standards often requires a service based architecture where network functions within the 5G control plane are characterized by modularized services that may be re-used by multiple network functions. Additionally, service based interfaces are used for the interactions between the core network control plane functions and for accessing services provided by Network Functions (NFs). This modularized approach towards defining a 5G control plane architecture is considered suitable for a virtualized network and offers greater reusability, scalability and interface simplification than a traditional point to point reference model.

A Service Based Architecture (SBA) for the 5G core network can often include Network Function Repository Services (NFRS) that define service discovery for the SBA of the 5G core network protocol (e.g., 3GPP, Release 15). According to the 5G core network protocol, a NF service consumer that intends to discover services available in the 5G core network can send a query to a Network Repository Function (NRF) that contains a service name and target NF type and a set of other parameters. The NF service consumer can invoke Nnrf_NFDiscovery_Request from an appropriately configured NRF in the same Public Land Mobile Network (PLMN).

According to the 5G core network protocol, an NRF uses an interface such as an Nnrf_NFDiscovery Service to discover other services offered by other NFs of the 5G core network. This interface is Hypertext Transfer Protocol (HTTP)-based and uses custom operations to carry parameters for service queries and corresponding responses. For instance, the NF service consumer might send a HTTP GET-request to the NRF with the query parameters for the service to be discovered. If there is a service or services that match the query parameters registered to the NRF, the NRF responds to the NF service consumer with HTTP 200 OK with the details of the services that are available for the NF service consumer. At times, there can be more than one matching service for the NF service consumer. If there are multiple services returned based on the query parameters received at the NRF from the NF service consumer, the NF service consumer can select at least one from the provided alternatives based on logic or other suitable bases according to the protocol of the NF service consumer. Based on the selection response received at the NRF from the NF service consumer regarding the selection of the at least one of the multiple matching services, the NF service consumer can connect to at least one corresponding NF service provider to commence using the selected at least one service provided by the at least one corresponding NF service provider.

A further functionality offered by the NRF under the 5G core network protocol is an OAuth2 authentication service, following the "Client Credentials" authorization grant, as specified in 3GPP TS 33.501. A "Token Endpoint" is described where the Access Token Request service can be requested by NF service consumers. The OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf.

The current service discovery and the related authentication mechanism for 5G release 15 is an HTTP-overlay. For a newly discovered service, a NF consumer needs to set up a HTTP2 connection (TLS+TCP connection) before it can start to consumer the actual service. To summarize, in the current approach there needs to be 2 HTTP level transactions: first one to discover suitable and matching NF service produces and the second done to request HTTP for authorization token to access the services within the selected NF service producer. In addition to this, the NF consumer needs to set up a HTTP2 connection which includes handshakes TCP connection handshake and a TLS connection handshake (that results in 6 (for TCP 2.5 and TLS 3.5 RTTs) in many cases) for the HTTP overlay.

Currently, an alternative protocol, a QUIC protocol, is being explored as an alternative to HTTP2. The QUIC protocol is a new transport protocol currently under development, one benefit of which is that the QUIC protocol integrates TLS handshake with the connection set up (QUIC application). This is expected to provide critical latency improvements for connection establishment in comparison to HTTP2. However, this benefit is not sufficiently realized for the 5G Release 15 style of HTTP-overlay discovery and access token requests, at least because these actions take place at the application layer and are not visible or accessible to the QUIC transport, according to the QUIC protocol.

One of the benefits of the methods, apparatuses, and computer program products described herein is that the approach combines the 3GPP 5G service discovery and service authentication mechanism by employing a connection handshake mechanism similar to the one of the QUIC protocol. The resulting approach is less messaging and faster connection established between NF service consumer and NF service provider. In other words, the approach results in a "low latency" control plane.

In terms of the conventional approach, the QUIC protocol allows servers to accept connections on one IP address and attempt to transfer these connections to "a more preferred address" as part of the connection handshake [QUIC-http section 2.4]. Conversely, in some embodiments, the NRF operates in the role of the "first server" (e.g., acting like a load balancer or the first origin server for any NF providers that has registered with it) and the discovered NFs will be in the role to the server where the connection is redirected. In this aspect, the disclosed approach avoids at least one connection establishment handshake typically required by the conventional approaches between the NF service consumer and the NF service provider.

In some embodiments, according to the disclosed approach, the NRF provides all necessary initial parameters to the NF consumer to directly access the discovered NF service producers without separate connection establishment and Transport Layer Security (TLS) handshakes. In some embodiments, the NF service producer can then change these settings after the QUIC connection establishment, if required.

In some embodiments, when the NRF finds out that both the NF service consumer and the requested NF service producer(s) support QUIC, it can return in its response to the requesting the NF service consumer a list of the matching servers together with authenticated values for the QUIC transport parameters of the NF service providers for later use when the NF service consumer contacts the NF service producer. In some embodiments, the NRF uses NF profile information that was proved to it at the time of NF service provider registration to find out which NF providers that are QUIC protocol capable. In some embodiments, this new attribute needs to be added to the NF profiles that are used for service discovery. In some embodiments, the transport parameters of QUIC are needed in a connection establishment as mandated by the QUIC specifications. In some embodiments, during connection establishment, both endpoints make authenticated declarations of their transport parameters. In some embodiments, these parameters are delivered by the NRF on behalf of the NF service provider(s) during the service discovery process and are protected by the NF service consumer—NRF discovery crypto protection. QUIC transport parameters are defined in Section 18.1 of [QUIC].

In some embodiments, to enable a Zero Round Trip Time Resumption (0-RTT)-like connection establishment, the NF service consumer (i.e., a client) that attempts to send 0-RTT data must remember or retain the transport parameters used by the NF service producer (i.e., the server) in the earlier transactions. This is obviously not the case if the NF service consumer needs to execute a service discover because it doesn't know about the NF service provider. In some embodiments, the QUIC specific transport parameters can be provided as part of the service discovery prior to the first QUIC connection establishment between the NF service consumer and the NF service provider.

Furthermore, in some embodiments, the QUIC stack can reuse the Access Token provided by the NRF Oath2 service. Currently, according to the QUIC protocol, 0-RTT connection set up is limited only to operations that do not change the state, i.e. so called "idempotent operations" only as they are considered save for replay attacks. Here, this requirement can be relaxed because NRF is acting as an authenticator for the requested service operations and provides an access token as explained in the background section and as is defined by 3GPP specifications. Furthermore, in some embodiments, this requirement can also be relaxed such that only those operations that do not have a valid access token are not accepted by the NF service provider.

In some embodiments, a server may provide clients with an address validation token during one connection that can be used on a subsequent connection. In some embodiments, the server uses a NEW_TOKEN frame to provide the client with an address validation token that can be used to validate future connections. In some embodiments, the client may then use this token to validate follow-up connections by including it in the Initial packet's header. In some embodiments, the NRF provides the address validation token in the form of an Access Token (or an algorithmic derivative thereof) to be used to by NF service consumers.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As used herein, "Service Based Architecture" ("SBA") refers to the structure, under the 5G protocol, of services and infrastructure, as application components accessed and provisioned through a communication protocol over a centralized or distributed network.

As used herein, "Network Function Repository Services" ("NFRS" or "services") refers to services maintained and supported by the Network Function Repository Function (NRF)

As used herein, "Network Function Repository Function" ("NRF") refers to 5G SBA that supports the service discovery function, NRFs being capable of receiving NF discovery requests from NF Service Consumers and providing information about discovered NF instances and services.

As used herein, "Hypertext Transfer Protocol" ("HTTP") refers to a set of rules for transferring files (such as text files, graphic images, sound, video, and other multimedia files) on the Internet.

Referring now to FIG. 1, FIG. 1 illustrates a block diagram of a system 100 for facilitating a combined service discovery and connection setup approach for a 5G SBA, according to an example embodiments. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating power saving in a base station cell, numerous other configurations may also be used to implement embodiments of the present disclosure.

The system 100 may include an apparatus 102 comprising a memory 104, including computer program code 106, and a processor 108. In some embodiments, the apparatus 102 can include a Network Repository Function (NRF). In some embodiments, the apparatus 102 can be stored on a network, a server, a cloud computing environment, or any other suitable computing and/or storage environment. In some embodiments, the apparatus 102 can be in communication with a network 110 via any suitable wireless or wired connection.

In some embodiments, the system 100 can further include a Network Function (NF) Service Provider 112 operably coupled to the apparatus 102 and/or the network 110. In some embodiments, the NF Service Provider 112 can be configured to provision one or more desired services associated with the apparatus 102. In some embodiments, the system 100 can further include a NF Service Consumer 114 operably coupled to the apparatus 102, the network 110, and/or the NF Service Provider 112. In some embodiments, the NF Service Consumer 114 can be configured to request a service from the apparatus 102, the network 110, and/or the NF Service Provider 112.

In some embodiments, the apparatus 102 can be configured to coordinate the NRF to provision a service to NF Service Consumers 114. In some embodiments, the memory 104 including the computer program code 106 and the processor 108 can be configured to cause the apparatus 102 to receive, from the NF Service Consumer 114, a request to access one or more desired services associated with the apparatus 102 (e.g., the NRF). In some embodiments, the request can include an indication of at least a transport layer network protocol (TLNP) supported by the NF Service Consumer 114.

In some embodiments, the apparatus 102 can be configured to determine whether the TLNP supported by the NF Service Consumer 114 is the same as the TLNP supported by the NF Service Provider 112. In some embodiments, in an instance in which it is determined that the TLNP supported by the NF Service Consumer 114 is the same as the TLNP supported by the NF Service Provider 112, the apparatus 102 can be configured to cause provision to the NF Service Consumer 114, without requiring a connection establishment handshake between the NF Service Consumer 114 and the NF Service Provider 112 associated with the desired service, of a list of matching services and authenticated values corresponding to the TLNP supported by the NF Service Consumer 114.

In some embodiments, the TLNP can be the Quick User Datagram Protocol Internet Connection (QUIC) transport layer network protocol, the User Datagram Protocol (UDP), the Lightweight User Datagram Protocol (UDP-Lite), the Transmission Control Protocol (TCP), the Datagram Congestion Control Protocol (DCCP), the Stream Control Transport Protocol (SCTP), the Partially Reliable Stream Control Transport Protocol (SCTP-PR), Structured Stream Transport (SST), Contrained Application Protocol (CoAP), HTTP/3, SPDY™, Datagram Transport Layer Security (DTLS), Reliable User Datagram Protocol (RUDP), Real-Time Media Flow Protocol (RTMFP), Micro Transport Protocol (µTP), Multipurpose Transaction Protocol (MTP/IP), Fast and Secure Protocol, any other such suitable protocol for service discovery and authentication, and any combination or variant thereof.

In some embodiments, the system 100 can include a plurality of the NF Service Provider 112, at least one or more of which correspond to the one or more desired services requested by the NF Service Consumer 114. In some embodiments, the apparatus 102 can be configured to receive, from at least some of the plurality of NF Service Providers 112, information indicative of NF Service Provider 112 connection capabilities and/or connection parameters suitable for service discovery. In some embodiments, the information indicative of NF Service Provider 112 connection capabilities and/or connection parameters can include at least a list of TLNP(s) supported by the NF Service Provider 112. In some embodiments, the apparatus 102 can be further configured to, in an instance in which the list of TLNP(s) supported by each NF Service Provider 112 is received from at least the one or more corresponding NF Service Providers 112, register the one or more corresponding NF Service Providers 112 as authenticated NF Service Providers 112 that are associated with the NRF. In some embodiments, the apparatus 102 can be further configured to provide query parameters to the NF Service Consumer 114. In some embodiments, the query parameters comprising at least a request for a list of transport layer network protocols by the network function service consumer. In some embodiments, the list of matching services and authenticated values are protected by a cryptographic authentication established between the network function service consumer and the network repository function.

In the apparatus 102, the processor 108 (and/or co-processors or any other circuitry assisting or otherwise associated with the processor) may be in communication with the memory 104 via a bus for passing information among components of the apparatus 102. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor, such as storing a warning message to be executed by the processor and displayed on the user interface 406.

The apparatus 102 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 108 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 108 may be configured to execute instructions stored in the memory 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the apparatus 102 can further include a communication interface (not shown). In some embodiments, the communication interface may be any means such as a device or circuitry embodied in either hardware or a combination of hardware and software that is configured to receive and/or transmit data from/to a network and/or any other device or module in communication with the apparatus 102, such as an wireless local area network (WLAN), core network, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the processor 108 (and/or coprocessors or any other circuitry assisting or otherwise associated with the processor) may be in communication with the memory 104 via a bus for passing information among components of the apparatus 102 and/or the network 110. The memory 104 may include, for example, one or more volatile and/or non-volatile memories. In other words, for example, the memory 104 may be an electronic storage device (e.g., a computer readable storage medium) comprising gates configured to store data (e.g., bits) that may be retrievable by a machine (e.g., a computing device like the processor 108). The memory 104 may be configured to store information, data, content, applications, instructions, or the like for enabling the apparatus to carry out various functions in accordance with an example embodiment of the present disclosure. For example, the memory 104 could be configured to buffer input data for processing by the processor 108. Additionally or alternatively, the memory 104 could be configured to store instructions for execution by the processor 108.

In some embodiments, the apparatus 102 may be embodied in various computing devices as described above. However, in some embodiments, the apparatus 102 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 102 may therefore, in some cases, be configured to implement an embodiment of the present disclosure on a single chip or as a single "system on a chip." As such, in some cases, a chip or chipset may constitute means for performing one or more operations for providing the functionalities described herein.

The processor 108 may be embodied in a number of different ways. For example, the processor 108 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 108 may include one or more processing cores configured to perform independently. A multi-core processor may enable multiprocessing within a single physical package. Additionally or alternatively, the processor 108 may include one or more processors configured in tandem via the bus to enable independent execution of instructions, pipelining and/or multithreading.

In an example embodiment, the processor 108 may be configured to execute instructions stored in the memory device 104 or otherwise accessible to the processor 108. Alternatively or additionally, the processor 108 may be configured to execute hard coded functionality, such as via the computer program code 106 stored in the memory 104. As such, whether configured by hardware or software methods, or by a combination thereof, the processor 108 may represent an entity (e.g., physically embodied in circuitry) capable of performing operations according to an embodiment of the present disclosure while configured accordingly. Thus, for example, when the processor 108 is embodied as an ASIC, FPGA or the like, the processor 108 may be specifically configured hardware for conducting the operations described herein. Alternatively, as another example, when the processor 108 is embodied as an executor of instructions, the instructions may specifically configure the processor 108 to perform the algorithms and/or operations described herein when the instructions are executed. However, in some cases, the processor 108 may be a processor of a specific device (e.g., an encoder and/or a decoder) configured to employ an embodiment of the present disclosure by further configuration of the processor 108 by instructions for performing the algorithms and/or operations described herein. The processor 108 may include, among other things, a clock, an arithmetic logic unit (ALU) and logic gates configured to support operation of the processor 108.

In embodiments that include a communication interface (not shown), the communication interface may be any means such as a device or circuitry embodied in either hardware or a combination of hardware and software that is configured to receive and/or transmit data from/to a network and/or any other device or module in communication with the apparatus 102, network 110, network elements of the same or different network, the NF Service Provider 112, the NF Service Consumer 114, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 2, a system 200 requesting services from an NRF is provided. In some embodiments, the system 200 can include an apparatus 214 (e.g., a Network Function Service Consumer, user device, etc.). In some embodiments, the apparatus 214 can include a memory 216, including computer program code 218, and a processor 220. In some embodiments, the apparatus 214 can be configured to initiate, send, cause sending of, or otherwise effectuate a request for a service from a NRF 202, a NF Service Provider 212, and/or a Network 210. In some embodiments, the apparatus 214 can be configured to access one or more desired services associated with the NRF 202. In some embodiments, the apparatus 214 can be configured to provide to the NRF 202 a request to access the one or more desired services.

In some embodiments, the request can include an indication of the TLNP supported by the apparatus 214. In some embodiments, in an instance in which the supported TLNP is the same as the TLNP supported by the corresponding NF Service Provider(s) 212, the apparatus 214 can be configured to receive a list of matching services and authenticated values corresponding to the supported TLNP. In some embodiments, the apparatus 214 can be configured to receive the list of matching services and authenticated values from the Network 210, the NRF 202, and/or the NF Service Provider 212. In some embodiments, after receiving the list of matching services and authenticated values, the apparatus 214 can be configured to connect to the one or more corresponding NF Service Provider 212, without being required to conduct a connection establishment handshake with the one or more NF Service Provider 212, to access the one or more desired services. In other words, in some embodiments, the apparatus 214 (e.g., NF Service Consumer) can be configured to carry out at least one handshake with the NRF 202 and/or the Network 210, which provides authentication for access and verifies the same or compatible TLNP is supported by the connected components of the system 200.

In some embodiments, some aspects or components of the system 200 can be very similar to or the same as corresponding aspects or components of the system 100, and are therefore not described in further detail here. It is noted, however, that any of the previously described circuitry, components, communications devices, processors, memories, and the like, can be the same or similar to those described above with respect to the system 100.

Referring now to FIG. 3, an approach is illustrated by which the NF Service Consumer (e.g., 114, 214) communicates initially (at step 1) with the NRF (e.g., 102, 202) to query the NRF regarding NF Service Providers and available services. In some embodiments, a network function service consumer desires to find a corresponding service using a Nnrf_NFDiscovery interface of the NRF. The NF service consumer sends a HTTP GET-request to NRF (at step 1) with the query parameters for the service to be discovered. If there is a match to the query parameters in the services registered to the NRF, the NRF responds to the NF Service Consumer (at step 2) via HTTP with 200 OK with the details of the services (SearchResult) that are available for the NF service consumer. There could be more than one matching service for the NF service consumer. If there are multiple choices of matching services, the NF consumer selects one from the provided alternatives based on its own logic. Based on the response from the NRF the NF Service consumer connects to the selected NF Service provider and starts to use the services of the NF Service Producer.

Referring now to FIG. 4, an approach is illustrated by which the NF Service Consumer (e.g., 114, 214) communicates initially (at step 1) with the NRF (e.g., 102, 202) to authenticate the NF Service Consumer for communication with the NF Service Providers and/or NRF and for authenticating, via a streamlined authentication process, access to the desired services. In some embodiments, the NRF can then determine whether the access token is suitable or in error, and can relay the authorization and relevant authorization information (at step 2) back to the NF Service Consumer. In some embodiments, the NRF can offer an OAuth2 authorization service, following the "Client Credentials" authorization grant, as specified in 3GPP TS 33.501. In some embodiments, the approach exposes a "Token Endpoint" where the Access Token Request service can be requested by NF Service Consumers. In some embodiments, the OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf.

Referring now to FIG. 5, an approach is illustrated by which the NF Service Consumer, NRF, and NF Service Producer communicate via a combined service discovery and connection setup approach for a 5G service-based architecture. The high-level message chart of FIG. 5 illustrates a combined service discovery, NF service access authentication and QUIC stack connection set up approach using 0-RTT. For simplicity reasons the diagram is omitting all TLS handshakes and stream set up actions. In FIG. 5, a Release 15 type NRF accessible via HTTP/2 is shown. In some embodiments, such as illustrated, both the NF Service Consumer and NF Service Producers are QUIC capable. In some embodiments, the precondition is that the NF Service Producer registers its QUIC settings for the NF service consumers (at step 0) of QUIC capable NF Service Producer. Then a NF Service Consumer makes a Release 15 style service discovery (at step 1). In some embodiments, such as when the NRF is QUIC capable, the service discovery can be carried out over a QUIC connection. However, in some embodiments, NRF notices that the NF Service Producer(s) support QUIC, which is considered to be a more efficient protocol for the requested type of communication. In some embodiments, in the service discovery response (at step 2), the NRF adds Alt-Srv headers [RCF 7838] for each matching QUIC capable NF Service Producers. In some embodiments, the approach reuses Alt-Srv headers to indicate the discovered services rather than alternative NRF services. As part of the access token authentication procedure (at steps 3 and 4), the NRF provides the QUIC connection setup parameters to be used as if they were received by a SETTING-frame of the QUIC protocol from the discovered NF Service Providers. The NF Service Consumer (or a socket layer thereof) can then configure the QUIC-stack to behave as it had during an earlier connection with the discovered NF Service Producer, and by this is able to enter a 0-RTT connection setup while avoiding additional QUIC handshakes. The resulting connection between the NF Service Consumer and the NF Service Provider (at step 5) involves a direct request for services by the NF Service Consumer, from the NF Service Provider, over the pre-authorized QUIC connection with the assurance that the supported TLNP will match therebetween. The NF Service Provider can then (at step 6) respond over the same pre-authorized QUIC connection with the results of the query (available services). In instance in which the NRF itself is QUIC capable, QUIC protocol may be used to carry the initial service discovery and authentication requests and responses during steps 1-4. In some embodiments, the way in which the additional parameters are to be encoded in QUIC is different and the configuration action between steps 4 and 5 (configuring the QUIC stack for 0-RTT ready to the NF Service Producers) can use at least the built-in logic of the QUIC protocol.

One of the benefits of the methods, apparatuses, and computer program products described herein is that the approach combines the 3GPP 5G service discovery and service authentication mechanism by employing a connection handshake mechanism similar to the one of the QUIC protocol. The resulting approach is less messaging and faster connection established between NF service consumer and NF service provider. In other words, the approach results in a "low latency" control plane.

In terms of the conventional approach, the QUIC protocol allows servers to accept connections on one IP address and attempt to transfer these connections to "a more preferred address" as part of the connection handshake [QUIC-http section 2.4]. Conversely, in some embodiments, the NRF operates in the role of the "first server" (e.g., acting like a load balancer or the first origin server for any NF providers that has registered with it) and the discovered NFs will be in the role to the server where the connection is redirected. In this aspect, the disclosed approach avoids at least one connection establishment handshake typically required by the conventional approaches between the NF service consumer and the NF service provider.

In some embodiments, according to the disclosed approach, the NRF provides all necessary initial parameters to the NF consumer to directly access the discovered NF service producers without separate connection establishment and Transport Layer Security (TLS) handshakes. In some embodiments, the NF service producer can then change these settings after the QUIC connection establishment, if required.

In some embodiments, when the NRF finds out that both the NF service consumer and the requested NF service producer(s) support QUIC, it can return in its response to the requesting the NF service consumer a list of the matching servers together with authenticated values for the QUIC transport parameters of the NF service providers for later use when the NF service consumer contacts the NF service producer. In some embodiments, the NRF uses NF profile information that was proved to it at the time of service registration to find out which NF providers that are QUIC protocol capable. In some embodiments, this new attribute needs to be added to the NF profiles that are used for service discovery. In some embodiments, the transport parameters of QUIC are needed in a connection establishment as mandated by the QUIC specifications. In some embodiments, during connection establishment, both endpoints make authenticated declarations of their transport parameters. In some embodiments, these parameters are delivered by the NRF on behalf of the NF service provider(s) during the service discovery process and are protected by the NF service consumer—NRF discovery crypto protection. QUIC transport parameters are defined in Section 18.1 of [QUIC].

In some embodiments, to enable a Zero Round Trip Time Resumption (0-RTT)-like connection establishment, the NF service consumer (i.e., a client) that attempts to send 0-RTT data must remember or retain the transport parameters used by the NF service producer (i.e., the server) in the earlier transactions. This is obviously not the case if the NF service consumer needs to execute a service discover because it doesn't know about the NF service provider. In some embodiments, the QUIC specific transport parameters can be provided as part of the service discovery prior to the first QUIC connection establishment between the NF service consumer and the NF service provider.

Furthermore, in some embodiments, the QUIC stack can reuse the Access Token provided by the NRF Oath2 service. Currently, according to the QUIC protocol, 0-RTT connection set up is limited only to operations that do not change the state, i.e. so called "idempotent operations" only as they are considered save for replay attacks. Here, this requirement can be relaxed because NRF is acting as an authenticator for the requested service operations and provides an access token as explained in the background section and as is defined by 3GPP specifications. Furthermore, in some embodiments, this requirement can also be relaxed such that only those operations that do not have a valid access token are not accepted by the NF service provider.

In some embodiments, a server may provide clients with an address validation token during one connection that can be used on a subsequent connection. In some embodiments, the server uses a NEW_TOKEN frame to provide the client with an address validation token that can be used to validate future connections. In some embodiments, the client may then use this token to validate follow-up connections by including it in the Initial packet's header. In some embodiments, the NRF provides the address validation token in the form of an Access Token (or an algorithmic derivative thereof) to be used to by NF service consumers.

Referring now to FIG. 6, a method 10 for requesting services from a NRF can include receiving, from the network function service consumer, a request to access the one or more desired services associated with the network resource function, the request comprising an indication of at least a transport layer network protocol supported by the network function service consumer, at 11. In some embodiments, the method 10 can further include determining whether the transport layer network protocol supported by the network function service consumer is a same transport layer network protocol supported by both the network function service consumer and one or more network function service providers associated with the one or more desired services, at 12. In some embodiments, the method 10 can further include, in an instance in which it is determined that the transport layer network protocol supported by the network function service consumer is the same transport layer network protocol supported by both the network function service consumer and the one or more network function service providers associated with the one or more desired services, providing to the network function service consumer, without requiring a connection establishment handshake between the network function service consumer and the one or more network function service providers associated with the one or more desired services, a list of matching services and authenticated values corresponding to the same transport layer network protocol, at 13.

Referring now to FIG. 7, a method 20 for combined service discovery and connection setup for a 5G service-based architecture can include, optionally, receiving, from at least a portion of the plurality of network function service providers, information indicative of each network function service provider's connection capabilities and/or connection parameters suitable for service discovery, the information comprising at least a list of supported transport layer network protocols, at 21. In some embodiments, the method 20 can further include, optionally, in an instance in which the list of supported transport layer network protocols is received from at least the one or more corresponding network function service providers, registering the one or more corresponding network function service providers as authenticated network function service providers associated with a network resource function, at 22. In some embodiments, the method 20 can further include receiving, from the network function service consumer, a request to access the one or more desired services associated with the network resource function, the request comprising an indication of at least a transport layer network protocol supported by the network function service consumer, at 23. In some embodiments, the method 20 can further include determining whether the transport layer network protocol supported by the network function service consumer is a same transport layer network protocol supported by both the network function service consumer and one or more network function service providers associated with the one or more desired services, at 24. In some embodiments, the method 20 can further include, in an instance in which it is determined that the transport layer network protocol supported by the network function service consumer is the same transport layer network protocol supported by both the network function service consumer and the one or more network function service providers associated with the one or more desired services, providing to the network function service consumer, without requiring a connection establishment handshake between the network function service consumer and the one or more network function service providers associated with the one or more desired services, a list of matching services and authenticated values corresponding to the same transport layer network protocol, at 25.

Referring now to FIG. 8, a method 30 for combined service discovery and connection setup for requesting NF services from NF Service Providers. In some embodiments, the method 30 can include providing, to the network resource function, a request to access the one or more desired services, the request comprising an indication of a transport layer network protocol supported by the network function service consumer, at 31. In some embodiments, the method 30 can include, in an instance in which the supported transport layer network protocol is a same transport layer network protocol supported by one or more corresponding network function service providers, receiving a list of matching services and authenticated values corresponding to the same transport layer network protocol, at 32. In some embodiments, the method 30 can further include, after receiving the list of matching services and authenticated values, connecting to the one or more corresponding network function service providers, without being required to conduct a connection establishment handshake with the one or more network function service providers, to access the one or more desired services, at 33.

Referring now to FIG. 9, a method 40 for provisioning one or more desired services associated with a network repository function to a network function service consumer can include, at least, receiving, from one or more network function service providers, network service profile information comprising an indication of at least a transport layer network protocol supported by the network function service provider, at 41. In some embodiments, the method can further include receiving, from a network function service consumer, a request to access the one or more desired services associated with the network repository function, the request comprising an indication of at least a transport layer network protocol supported by the network function service consumer, at 42. In some embodiments, the method can further include determining whether the transport layer network protocol supported by the network function service consumer is a same transport layer network protocol supported by both the network function service consumer and one or more network function service providers associated with the one or more desired services, at 43. In some embodiments, in an instance in which it is determined that the transport layer network protocol supported by the network function service consumer is the same transport layer network protocol supported by both the network function service consumer and the one or more network function service providers associated with the one or more desired services, the method can further include providing to the network function service consumer, without requiring a connection establishment handshake between the network function service consumer and the one or more network function service providers associated with the one or more desired services, a list of matching services and authenticated values corresponding to the same transport layer network protocol, at 44. In some embodiments, the transport layer network protocol supported by both the network function service consumer and the one or more network function service providers is QUIC. In some embodiments, one or more of the indication of at least the transport layer network protocol supported by the network function service provider and the indication of at least the transport layer network protocol supported by the network function service consumer is received via an HTTP/2 protocol.

Referring now to FIG. 10, a method 50 for provisioning one or more desired services associated with a network repository function to a network function service consumer can include, at least, establishing a first connection with one or more network function service providers via a first transport layer network protocol type, at 51. In some embodiments, the method 50 further includes receiving from the one or more network function service providers, via the first connection, network service profile information comprising an indication of at least a second transport layer network protocol type supported by the network function service provider, at 52. In some embodiments, the method 50 can further include establishing a second connection with the network function service consumer via a third transport layer network protocol type, at 53. In some embodiments, the method 50 can further include receiving, from the network function service provider, a request to access the one or more desired services associated with the network repository function, the request comprising an indication of at least a fourth transport layer network protocol type supported by the network function service consumer, at 54. In some embodiments, the method 50 can further include determining whether the second transport layer network protocol type and the fourth transport layer network protocol type are a same transport layer network protocol type, at 55. In some embodiments, in an instance in which it is determined that the transport layer network protocol supported by the network function service consumer is the same transport layer network protocol supported by both the network function service consumer and the one or more network function service providers associated with the one or more desired services, the method 50 can further include providing to the network function service consumer, without requiring a connection establishment handshake between the network function service consumer and the one or more network function service providers associated with the one or more desired services, a list of matching services and authenticated values corresponding to the same transport layer network protocol, at 56. In some embodiments, the first transport layer network protocol type and/or the third transport layer network protocol type can be HTTP/2, and both the second transport layer network protocol type and the fourth transport layer network protocol type can be QUIC.

It will be understood that each block of the flowcharts of FIGS. 6-10, and any combination of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104, 216 of an apparatus 102, 114, 202, 214 employing an embodiment of the present disclosure and executed by processing circuitry, e.g., a processor 108, 220, of the apparatus 102, 214. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart of FIGS. 6-10 support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for provisioning one or more desired services associated with a network repository function to a network function service consumer, the method comprising:
   receiving, from the network function service consumer, a request to access the one or more desired services associated with the network repository function, the request comprising an indication of at least a transport layer network protocol supported by the network function service consumer;
   determining whether the transport layer network protocol supported by the network function service consumer is a same transport layer network protocol supported by both the network function service consumer and one or more network function service providers associated with the one or more desired services; and
   in an instance in which it is determined that the transport layer network protocol supported by the network function service consumer is the same transport layer network protocol supported by both the network function service consumer and the one or more network function service providers associated with the one or more desired services, providing to the network function service consumer, without requiring a connection establishment handshake between the network function service consumer and the one or more network function service providers associated with the one or more desired services, a list of matching services and authenticated values corresponding to the same transport layer network protocol.

2. The method of claim 1, wherein the same transport layer network protocol is a Quick User Datagram Protocol Internet Connection (QUIC) transport layer network protocol.

3. The method of claim 1, wherein a plurality of network function service providers comprises at least the one or more corresponding network function service providers, the method further comprising:
   receiving, from at least a portion of the plurality of network function service providers, information indicative of each network function service provider's connection capabilities and connection parameters, the information comprising at least a list of supported transport layer network protocols; and
   in an instance in which the information indicative of each network function service provider's connection capabilities and connection parameters is received from at least the one or more corresponding network function service providers, registering the one or more corresponding network function service providers as authenticated network function service providers associated with a network repository function.

4. The method of claim 1, further comprising:
   providing query parameters to the network function service consumer, the query parameters comprising at least a request for a list of transport layer network protocols by the network function service consumer.

5. The method of claim 1, wherein the list of matching services and authenticated values are protected by a cryptographic authentication established between the network function service consumer and the network repository function.

6. A method for a network function service consumer to access one or more desired services associated with a network repository function, the method comprising:
   providing, to the network repository function, a request to access the one or more desired services, the request comprising an indication of a transport layer network protocol supported by the network function service consumer;
   in an instance in which the supported transport layer network protocol is a same transport layer network protocol supported by one or more corresponding network function service providers, receiving a list of matching services and authenticated values corresponding to the same transport layer network protocol; and
   after receiving the list of matching services and authenticated values, connecting to the one or more corresponding network function service providers, without being required to conduct a connection establishment handshake with the one or more network function service providers, to access the one or more desired services.

7. The method of claim 6, wherein the same transport layer network protocol is a Quick User Datagram Protocol Internet Connection (QUIC) transport layer network protocol.

8. The method of claim 6, further comprising:
   receiving, from the network repository function, query parameters comprising at least a request for a list of transport layer network protocols by the network function service consumer.

9. The method of claim 6, wherein the list of matching services and authenticated values are protected by a cryptographic authentication established between the network function service consumer and the network repository function.

10. An apparatus configured to provision one or more desired services associated with a network repository function to a network function service consumer, the apparatus comprising at least one processor and at least one memory including computer program code, the at least one memory and the computer program code configured to, with the processor, cause the apparatus to at least:
   receive, from a network function service consumer, a request to access one or more desired services associated with a network repository function, the request comprising an indication of at least a transport layer network protocol supported by the network function service consumer;
   determine whether the transport layer network protocol supported by the network function service consumer is a same transport layer network protocol supported by both the network function service consumer and one or more network function service providers associated with the one or more desired services; and
   in an instance in which it is determined that the transport layer network protocol supported by the network function service consumer is the same transport layer network protocol supported by both the network function service consumer and the one or more network function service providers associated with the one or more desired services, cause provision to the network function service consumer, without requiring a connection establishment handshake between the network function service consumer and the one or more network function service providers associated with the one or more desired services, of a list of matching services and authenticated values corresponding to the same transport layer network protocol.

11. The apparatus of claim 10, wherein the same transport layer network protocol is a Quick User Datagram Protocol Internet Connection (QUIC) transport layer network protocol.

12. The apparatus of claim 10, wherein a plurality of network function service providers comprises at least the one or more corresponding network function service providers, wherein the at least one memory and the computer program code are configured to, with the processor:
   receive, from at least a portion of the plurality of network function service providers, information indicative of each network function service provider's connection capabilities and connection parameters, the information indicative of each network function service provider's connection capabilities and connection parameters comprising at least a list of supported transport layer network protocols; and
   in an instance in which the information indicative of each network function service provider's connection capabilities and connection parameters is received from at least the one or more corresponding network function service providers, register the one or more corresponding network function service providers as authenticated network function service providers associated with a network repository function.

13. The apparatus of claim 10, wherein the at least one memory and the computer program code are configured to, with the processor:
   provide query parameters to the network function service consumer, the query parameters comprising at least a request for a list of transport layer network protocols by the network function service consumer.

14. The apparatus of claim 11, wherein the list of matching services and authenticated values are protected by a cryptographic authentication established between the network function service consumer and the network repository function.

15. An apparatus configured to request access from a network repository function to one or more desired services, the apparatus comprising at least one processor and at least one memory including computer program code, the at least one memory and the computer program code configured to, with the processor, cause the apparatus to at least:
provide, to the network repository function, a request to access the one or more desired services, the request comprising an indication of a transport layer network protocol supported by the network function service consumer;
in an instance in which the supported transport layer network protocol is a same transport layer network protocol supported by one or more corresponding network function service providers, receive a list of matching services and authenticated values corresponding to the same transport layer network protocol; and
after receiving the list of matching services and authenticated values, connect to the one or more corresponding network function service providers, without being required to conduct a connection establishment handshake with the one or more network function service providers, to access the one or more desired services.

16. The apparatus of claim 15, wherein the same transport layer network protocol is a Quick User Datagram Protocol Internet Connection (QUIC) transport layer network protocol.

17. The apparatus of claim 15, wherein the at least one memory and the computer program code are configured to, with the processor:
receive query parameters from the network repository function, the query parameters comprising at least a request for a list of transport layer network protocols by the network function service consumer.

18. The apparatus of claim 15, wherein the list of matching services and authenticated values are protected by a cryptographic authentication established between the network function service consumer and the network repository function.

19. A computer program product suitable for provisioning one or more desired services associated with a network repository function to a network function service consumer, the computer program product comprising at least one non-transitory computer-readable storage medium having computer-readable program code portions stored therein, the computer-readable program code portions configured, upon execution, to:
receive, from a network function service consumer, a request to access one or more desired services associated with a network repository function, the request comprising an indication of at least a transport layer network protocol supported by the network function service consumer;
determine whether the transport layer network protocol supported by the network function service consumer is a same transport layer network protocol supported by both the network function service consumer and one or more network function service providers associated with the one or more desired services; and
in an instance in which it is determined that the transport layer network protocol supported by the network function service consumer is the same transport layer network protocol supported by both the network function service consumer and the one or more network function service providers associated with the one or more desired services, cause provision to the network function service consumer, without requiring a connection establishment handshake between the network function service consumer and the one or more network function service providers associated with the one or more desired services, of a list of matching services and authenticated values corresponding to the same transport layer network protocol.

20. The computer program code of claim 19, wherein the same transport layer network protocol is a Quick User Datagram Protocol Internet Connection (QUIC) transport layer network protocol.

21. The computer program code of claim 19, wherein a plurality of network function service providers comprises at least the one or more corresponding network function service providers, wherein the computer code portions are configured to:
receive, from at least a portion of the plurality of network function service providers, information indicative of each network function service provider's connection capabilities and connection parameters, the information indicative of each network function service provider's connection capabilities and connection parameters comprising at least a list of supported transport layer network protocols; and
in an instance in which the information indicative of each network function service provider's connection capabilities and connection parameters is received from at least the one or more corresponding network function service providers, register the one or more corresponding network function service providers as authenticated network function service providers associated with a network repository function.

* * * * *